United States Patent [19]

Saleeba

[11] 4,452,419
[45] Jun. 5, 1984

[54] MODULAR CAKE PAN

[76] Inventor: Burvelle E. Saleeba, 7010 Cherrytree Ave., Citrus Heights, Calif. 95610

[21] Appl. No.: 405,489

[22] Filed: Aug. 5, 1982

[51] Int. Cl.³ .......................... B29C 1/00; A21B 5/02
[52] U.S. Cl. .................................. 249/53 R; 99/428; 249/119; 249/122; 249/124; 249/135
[58] Field of Search ..................... 249/119, 53 R, 135, 249/122, 124; 99/426, 428

[56] References Cited

U.S. PATENT DOCUMENTS 2,309,579  1/1943  Duran .................................. 249/119
2,493,854  1/1950  Brainard ............................. 249/119

Primary Examiner—Willard E. Hoag
Attorney, Agent, or Firm—Lothrop & West

[57] ABSTRACT

A cake pan with a horizontal bottom and peripheral upstanding side walls temporarily receives one or more cake-shaping modular inserts while a cake is being baked, or otherwise fixed in shape. A matrix, or gridwork, delineated on the bottom of the receptacle is matched to the size and shape of the modular inserts and provides a guide for the proper positioning of the modular inserts in order to form the cake into selected alpha-numeric configurations.

4 Claims, 24 Drawing Figures

MODULAR CAKE PAN

BACKGROUND OF THE INVENTION

On special occasions, such as birthdays, wedding anniversaries and retirement parties, it is frequently appropriate to present the honoree with a cake which forms the center piece of the event by visually designating the extent of the passage of time being featured.

Thus, on a child's 6th birthday, for example, 6 candles are often placed on top of the cake or the top of the cake is decorated with the numeral 6. In like manner, at a golden wedding anniversary, the numeral 50 is often added by some kind of decoration on top of the cake.

Should the honoree be especially fortunate, the cake itself is formed into the shape of a numeral or letters having long-remembered significance. That is to say, the cake itself is shaped so as to form the numeral 6 or the numeral 50; or to form the honoree's initials or nickname.

Despite the fact that everyone enjoys these unique confections, it is rare that anyone other than a baker can provide the skill necessary to prepare a cake having alphanumeric configurations. Thus, owing to the cost involved, the use of such cakes is limited to relatively few occasions.

SUMMARY OF THE INVENTION

The invention relates to cake pans which are especially arranged for use even by inexperienced people to enable them economically to prepare cakes possessing any desired shape, including letters and numerals.

A cake pan having a bottom and vertical side walls is interiorly subdivided by walled modular inserts into a plurality of discrete areas some only of which are filled with cake batter to form a selected shape. After the cake batter has been "set", as by baking or by refrigeration, the cake is separated from the pan and from the modular inserts. The selectively shaped cake can then be covered with frosting or otherwise decorated, as desired, in order to make it ready for presentation.

The modular inserts are fabricated in a variety of configurations; and in order to assist the user in the proper positioning of the inserts, a grid-like matrix, or network, is formed on the bottom of the pan to engage the bottom edges of the insert walls and maintain the inserts in accurate alignment and placement relative to the pan boundary walls until the cake is ready to be separated from the pan and the modular inserts.

BRIEF DESCRIPTION OF THE DRAWING FIGURES

Figure 4:
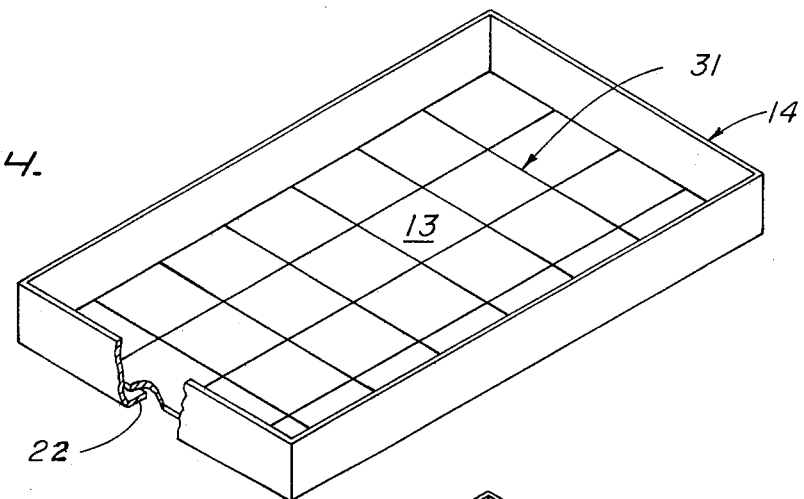
FIG. 4 is a top perspective view of a modified form of pan in which the bottom panel is separate from the end walls and the side walls and is supported by inwardly projecting flanges on the bottom edge of the walls, as illustrated in a portion broken away.
Figure 7:
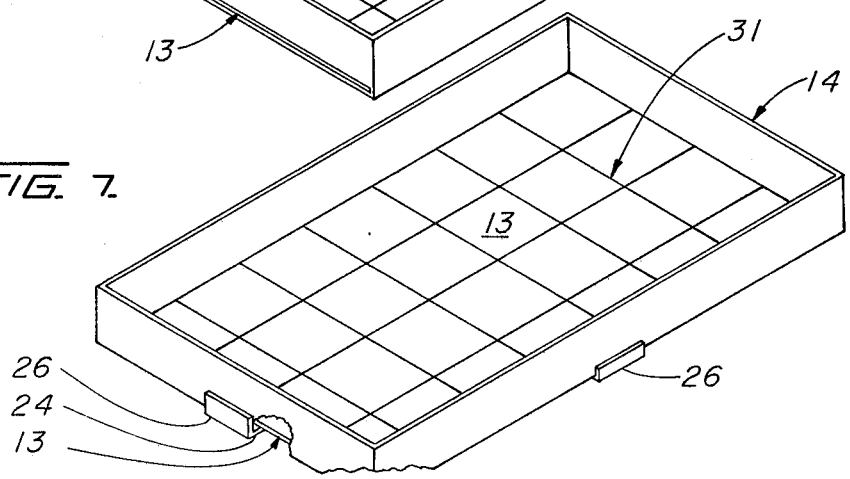
Figure 8:
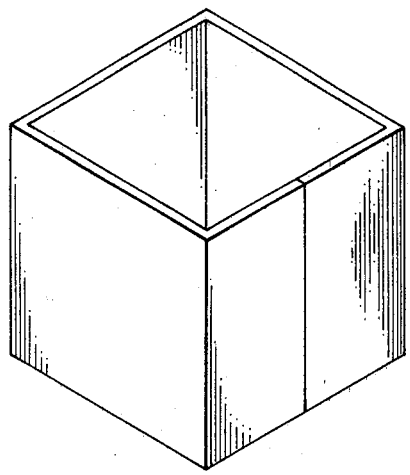
Figure 9:
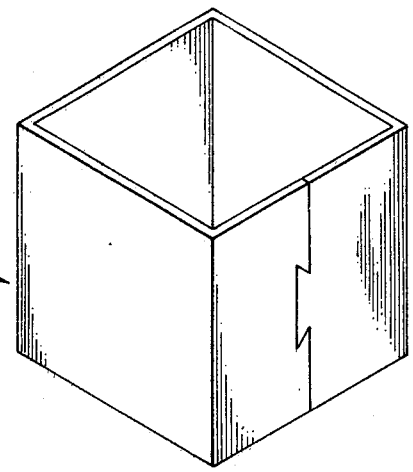
Figure 10:
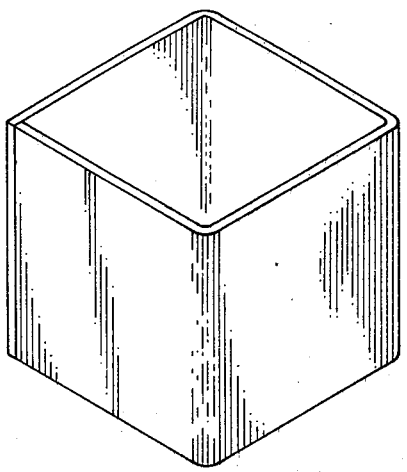
Figure 11:
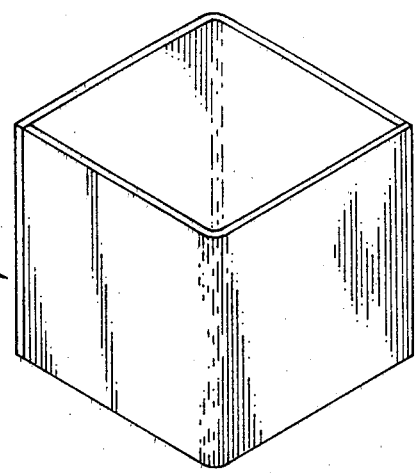
Figure 12:
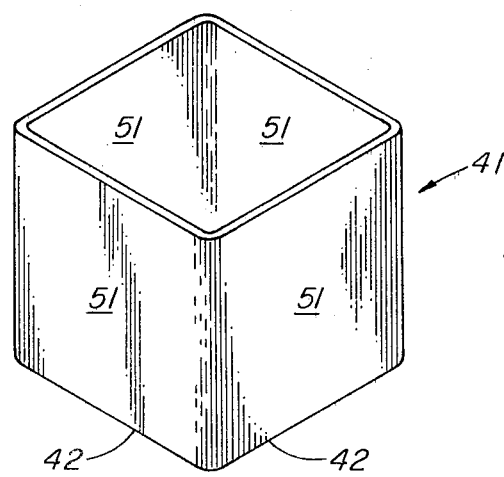

FIG. 7 is a view similar to that of FIG. 4 but showing yet another modification in the cake pan wherein the bottom is a separate panel, or sheet, which is supported on underlying horizontal shelves of L-shaped in section brackets, or clips, mounted on the end walls and side walls of the cake pan, as illustrated in a broken away portion, and with a corner of the figure broken away to reduce the extent thereof;

FIG. 8 is a perspective view of one form of modular insert in which the vertical walls are formed of a piece of material bent so that the two ends abut along a joint on one side;

FIG. 9 is a view similar to that of FIG. 8 showing another form of modular insert, but with the two ends joined in a dovetail joint;

FIG. 10 is a view similar to that of FIG. 8 showing yet another form of modular insert, but with the two ends joined at a corner;

FIG. 11 is a view similar to that of FIG. 8 but showing a modular insert comprised to two L-shaped sections joined together at their opposite ends;

FIG. 12 is a perspective view of a modular insert comprising a single member, such as a piece of extruded metal, formed to the desired length;

FIGS. 13-22 inclusive illustrate various forms of matrices which can be used to provide indicia for the accurate placement of modular inserts on a pan bottom.

DETAILED DESCRIPTION OF A PREFERRED EMBODIMENT OF THE INVENTION

While the modular cake pan is susceptible of numerous different physical embodiments, depending upon the environment and requirements of use, prototypes of several of the herein shown and described embodiments have been made, tested and used and have performed in an eminently satisfactory manner.

The modular cake pan of the invention, generally designated by the reference numeral 11, includes a vessel 12, such as a cake pan, having a horizontal bottom 13, or bottom panel or sheet, and upstanding peripheral walls 14.

Although not limited thereto, the cake pan 12 is preferably rectangular in plan and includes two parallel, longitudinal, side walls 16 and two parallel, transverse end walls 17.

Although not illustrated herein, in the interests of simplifying and clarifying the disclosure, it is sometimes desirable to provide lips projecting from the top edges of the end walls 17 to assist in lifting the pan when hot.

Figure 1:
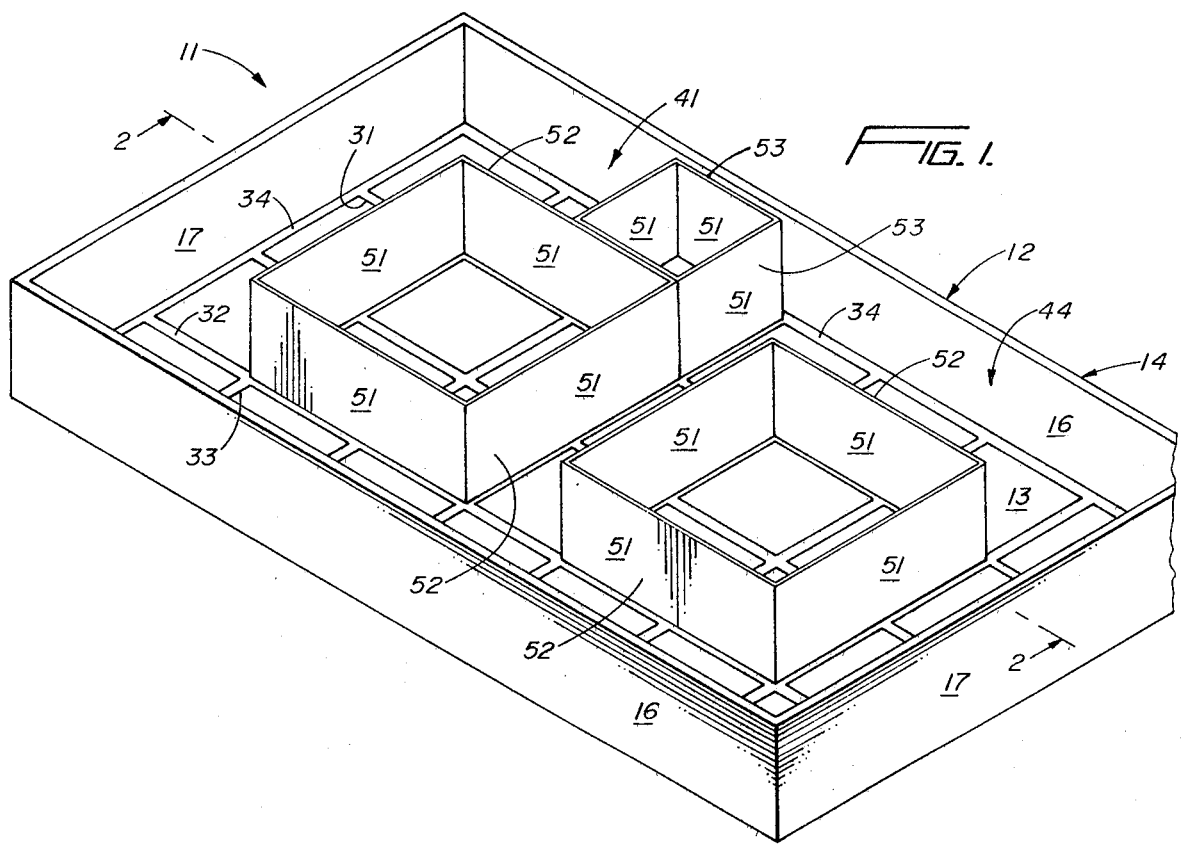
FIG. 1 is a top front perspective view of a preferred embodiment of the modular cake pan of the invention showing a one-piece pan with three modular inserts arranged on the grid matrix in such a way as to define the block numeral "6", a portion of the figure being broken away to reduce the extent thereof.
Figure 2:
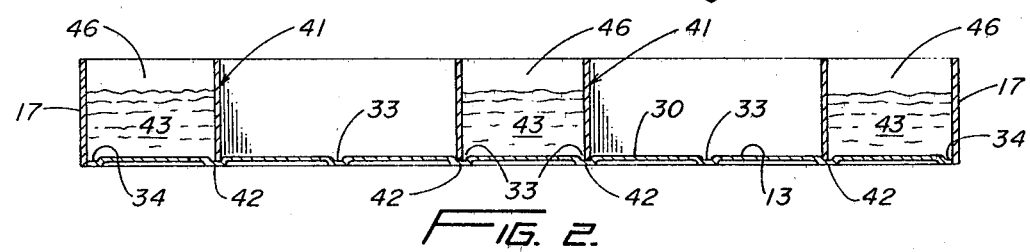
FIG. 2 is a median, vertical, longitudinal section, the plane of the section being indicated by the reference numeral 2—2 in FIG. 1, with cake batter being shown in the three transverse channels, or bays.

In the embodiment depicted most clearly in FIGS. 1 and 2 the four walls 14 and the bottom panel 13, are unitary in nature. The integral unit can be made of a material, such as metal, glass or ceramic.

Variations on the unitary construction of the cake pan shown in FIGS. 1 and 2 are illustrated in FIGS. 4–7 and include walls 14 which are arranged so as to support a separate bottom 13.

In the form of device shown in FIG. 4, for example, the bottom 13 is supported by a marginal flange 22 projecting inwardly from the bottom edge of the walls 14.

Figure 5:
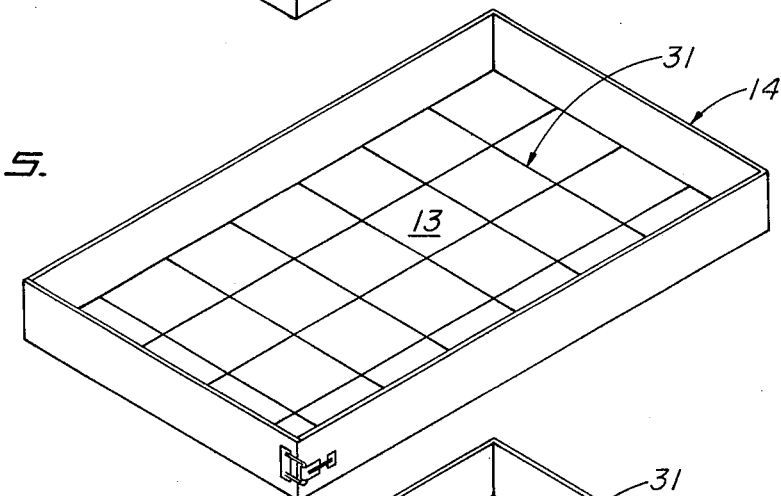
FIG. 5 is a view similar to that of FIG. 4 but illustrating another modified form of side wall construction wherein the walls are opened and closed by a corner latch, and the bottom is a separate panel with its margins supported by flanges as in FIG. 4.

In FIG. 5, one or both side walls are in latching engagement with the end walls and the bottom 13 is confined, for example, by bottom flanges as in the FIG. 4 modification.

Figure 6:
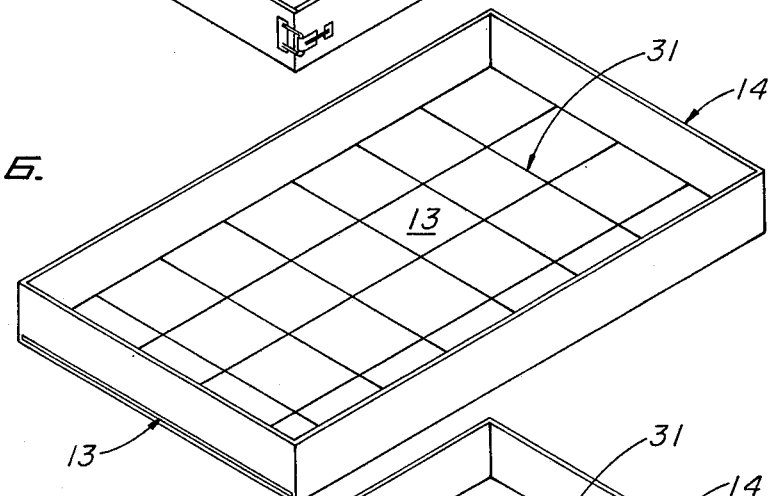
FIG. 6 is a view similar to that of FIG. 4 but illustrating still another modification in the cake pan wherein the bottom is a separate panel which is longitudinally slidable relative to the side walls and is supported by a transverse subjacent horizontal panel or strips spanning the bottom edges of the side walls.

In FIG. 6 the bottom 13 is slidably disposed relative to the walls.

In FIG. 7 the bottom 13 is supported by the horizontal portion 24 of L-shaped clips 26.

Reverting to the preferred form shown most clearly in FIGS. 1 and 2, the bottom panel 13 is characterized by a matrix 31, or network, which is preferably of a square grid nature.

To form the grid matrix 31, the bottom panel 13 is molded, or stamped or otherwise formed so that the upper surface 30 of the bottom panel 13 is interrupted by a plurality of parallel equally spaced longitudinal grooves 32 and a plurality of parallel, equally spaced transverse grooves 33 which intersect the longitudinal grooves 32 at corners, as shown.

The outer perimeter of the bottom panel 13 is formed with a peripheral groove 34. The peripheral groove 34 intersects with the longitudinal grooves 32 and the transverse grooves 33, as appears most clearly in FIG. 1.

Not only do the groove corrugations provided by the matrix 31 stiffen the bottom panel 13, but, and more importantly, they establish a grid-like subdivision, or network, which facilitates the accurate placement of a plurality of modular inserts, generally designated by the reference numeral 41.

It should also be noted that as a result of the cooperating nature of the grooves, or troughs, or trenches, of the grid matrix 31, and the bottom edges 42 of the modular inserts 41, an effective seal is provided which prevents, or at least inhibits the cross flow of cake batter 43 (see FIG. 2) from the cake channels 44, or bays, into the adjacent modular inserts 41.

Although a matrix 31 comprising recessed grooves is preferred, it should be recognized that other types of matrix construction are possible, such as a grid network of raised ridges.

So also, while a square grid matrix, as disclosed in FIGS. 1–7, works very satisfactorily, variations can be used, such as the several different configurations shown in FIGS. 13–22. Where such variations are utilized, the bottom edges 42, or bottom surfaces, of the modular inserts 41 are modified accordingly so as to conform to the respective modified shapes.

Figure 13:
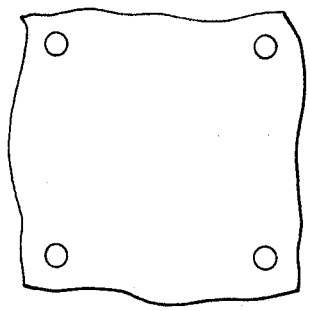

The FIG. 13 modification is conveniently identified as a 4-dimple matrix and the corresponding modular insert would be provided with four legs, at the bottom four corners of the insert to register with the four recessed dimples.

Figure 14:
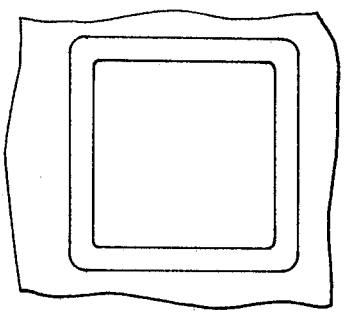
Figure 15:
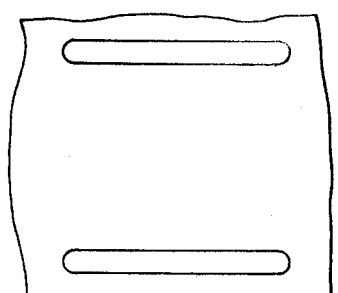
Figure 16:
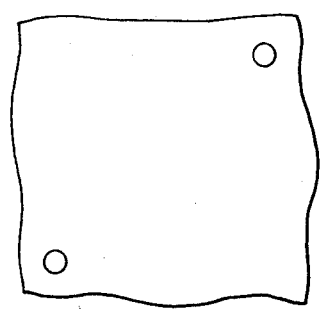
Figure 17:
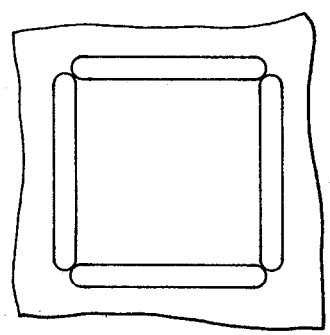
Figure 18:
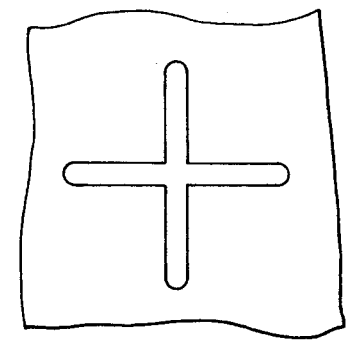
Figure 19:
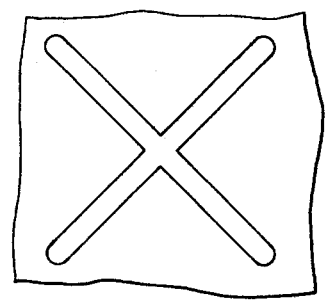
Figure 20:
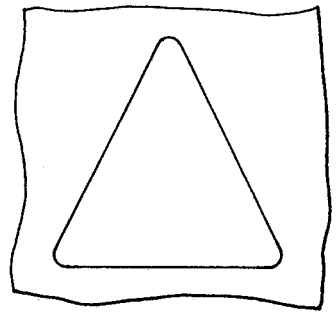
Figure 21:
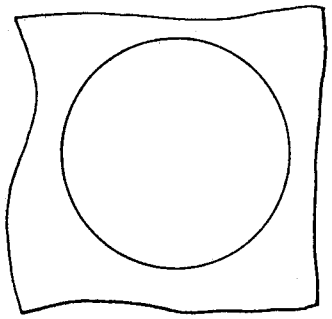
Figure 22:
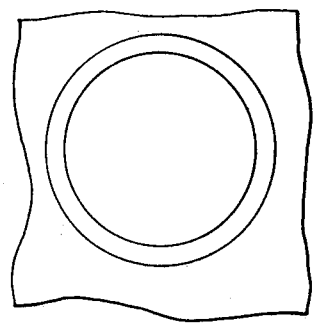

In like manner, FIG. 14 is of hollow box configuration; FIG. 15, 2-bar; FIG. 16, 2-dimple; FIG. 17, 4-bar; FIG. 18, cross; FIG. 19, X; FIG. 20, triangle; FIG. 21, circle; and FIG. 22, ring. In each case, the modular insert would be modified to conform.

The modular inserts 41 are preferably of the unitary type shown most clearly in FIGS. 1 and 12, and are preferably of metal. Each modular cake pan kit would ordinarily include at least one cake pan 12 and at least a half dozen modular inserts 41 of one or more different sizes.

In the preferred embodiment shown in FIGS. 1, 2 and 12, the modular inserts 41 are unitary and comprise four upstanding side walls 51 arranged in hollow box form.

The vertical insert walls 51 are approximately the same height as the walls 14 of the cake pan 12, as shown in FIGS. 1 and 2, and are of at least two sizes, a larger size 52 and a smaller size 53. The smaller size 53 has walls 51 which are one half the length of the walls 51 of the larger size insert 52 and the lower edges 42 of both sizes conform precisely to the square grid matrix 31.

FIGS. 8–11 disclose a few of the variant structural shapes which can be assumed by the modular inserts.

The structure illustrated in FIG. 8 includes a butt joint along one side 51; FIG. 9 a dovetail joint; FIG. 10, a single corner joint; and FIG. 11, a two-corner joint.

Operation

With particular reference to FIGS. 1, 2, 3A, 3B and 3C, the manner in which the device is used to produce a cake of any desired alphanumeric shape will now be described in detail.

First, assuming that a cake is to be in the shape of a block numeral "6", as in FIG. 1, two of the larger size modular inserts 52 are located in the matrix grooves as shown, with a single transverse cake channel 46, or bay, separating each of the modular inserts from each other and from the respective end walls 17; and longitudinal cake channels 47, or bay, separating the large modular inserts from the adjacent walls 16.

A single smaller size modular insert 53 is located in the upper right-hand longitudinal channel 47 so that it snugly abuts, and registers with, the adjacent side wall of the large insert 52, as shown in FIG. 1.

The lower edges of the abutting side walls of the larger inserts 52 and the smaller inserts 53 share a common longitudinal matrix groove 32 and are held securely in that position by the opposite walls of the groove 32, which are spaced apart a distance such as to afford a close fit to the pair of abutting side walls of two modular inserts which have a predetermined gauge, or thickness.

The peripheral grooves 34 of the matrix are narrower than the longitudinal grooves 32 and the transverse grooves 33 since the peripheral grooves 34 never receive, at any one time, more than the wall thickness of a single modular insert.

The modular inserts 41, in other words, in conjunction with the cake pan walls and the bottom matrix 31 afford relatively tight fits effective to prevent cross flow of the cake batter 43.

After cake batter is poured about ⅔ full in the various channels, or bays, surrounding the modular inserts, as indicated in FIG. 2, the cake is either baked or refrigerated, depending upon the particular batter ingredients being used.

After the cake has baked, or otherwise "set", a sharp knife is run around the appropriate vertical walls to separate the cake from the walls of the inserts. The inserts can then be removed. Thereafter, a spatula is run under the cake to separate it from the bottom 13.

At this juncture, a cake rack, not shown, is placed on top of the pan, over the cake, which has risen aproximately to wall height. The pan, the cake and the rack are then inverted and the cake pan is removed, leaving the cake by itself on the rack.

The cake can thereupon be inverted again on a serving tray and frosted, or iced, and suitably decorated, preparatory to being served.

Figures 3A, 3B, 3C:
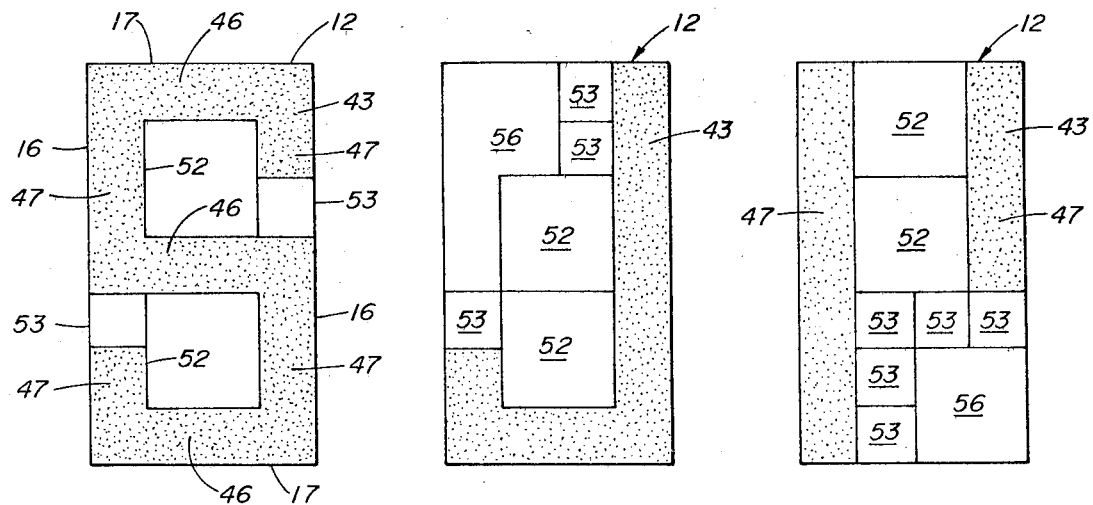
FIG. 3A is a schematic top plan view illustrating the arrangement of four modular inserts used to form the block letter "S"
FIG. 3B is a schematic top plan view with five modular inserts arranged to form the block letter "J"
FIG. 3C is a schematic top plan view with the components arranged to furnish the two elements, one vertical, one horizontal, of the block letter "T"

FIG. 3A schematically illustrates the arrangement of the large modules 52 and the small modules 53 in the cake pan 12 to form the cake batter 43 into a block letter "S"; and in FIG. 3B, the letter "J".

In the case of the letter "J", two large modules 52 and three small modules 53 are used. The balance of the space 56 remains vacant since cake batter 43 is poured only in the area defining the letter "J".

In FIGS. 3A, 3B and 3C the matrix grooves 31 are omitted in the interests of clarity.

FIG. 3C illustrates still another arrangement of large modules 52 and small modules 53 defining a blank space 56 and two separate longitudinal channels for receiving cake batter 43. The left-hand channel 47 forms a piece of cake one square wide and seven squares long and the right-hand longitudinal channel 47 is one square wide and four squares long. The finished cake is cut away from the walls by a knife, the modules are removed and the cake inverted by using a cake rack, as before. This time, however, the cake in the longer one of the channels 47 is used as a vertical leg of a "T" and the cake in one of the short longitudinal channels 47 is used to cross the "T".

The purchaser of the present device is preferably furnished a handbook, or manual, of figures similar to FIGS. 3A, 3B and 3C herein. The manual would cover how block FIGS. 1-9 and 0 are made, as well as all of the letters of the alphabet. Common symbols, such as a cross can also be included and if desired the ordinal number abbreviations, such as lower case "st" "nd" "rd" and "th".

It is to be noted that while the present matrix arrangement provides a square grid network which is seven squares long and four squares wide, for a total of twenty eight square spaces, other geometrical configurations and proportions can be used, either by themselves or in conjunction with the embodiments disclosed herein.

I claim:

1. A variable, modular cake pan for forming cakes in the shape of letters or numbers, comprising:
    (a) four upstanding sidewalls defining a frame, a bottom panel member, said frame and said panel member forming a mold cavity;
    (b) said panel member having a peripheral groove, at least two longitudinal grooves and six transverse grooves within the area surrounded by said peripheral groove so that the groove surface of said panel member is divided by said grooves into at least 21 equal squares;
    (c) at least one square member defined by four upstanding walls enclosing an area equal to at least two of said squares when placed on said panel,
    (d) at least a second square member defined by four upstanding walls and enclosing an area equal to one of said squares when placed on said panel,
    (e) all of said square members having edges matching said grooves and being receivable into said grooves;
    (f) whereby, said square members, said panel and said frame define said cake pan with areas excluded by said square members forming a cavity for receiving cake batter.

2. A cake pan as in claim 1 wherein the width of said longitudinal and transverse grooves is approximately the same as twice the thickness as the lower edge of one said square member for snug engagement with edges of two face-to-face abutting walls of said square members.

3. A cake pan as in claim 1, said peripheral groove having a width approximately the same as the thickness of the upstanding walls of one said square member.

4. A modular cake pan as in claim 3 in which said matrix means is seven squares long and four squares wide.

* * * * *